US006311950B1

(12) United States Patent
Kappel et al.

(10) Patent No.: US 6,311,950 B1
(45) Date of Patent: Nov. 6, 2001

(54) FLUID METERING DEVICE

(75) Inventors: Andreas Kappel, Brunnthal; Bernhard Fischer, Toeging A. Inn; Bernhard Gottlieb; Randolf Mock, both of Munich; Eric Chemisky; Hans Meixner, both of Haar, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/553,371

(22) Filed: Apr. 20, 2000

(30) Foreign Application Priority Data

Apr. 20, 1999 (DE) ............................................. 199 17 839

(51) Int. Cl.[7] ........................... F16K 31/02; F16K 39/00; F16K 31/00

(52) U.S. Cl. ................. 251/129.06; 251/282; 251/335.3; 251/337

(58) Field of Search ................................ 251/335.3, 282, 251/337, 129.06

(56) References Cited

U.S. PATENT DOCUMENTS

| | | | |
|---|---|---|---|
| 2,521,224 | | 9/1950 | Kammer . |
| 3,076,439 | | 2/1963 | Arnold . |
| 3,097,662 | * | 7/1963 | Peters . |
| 3,573,863 | * | 4/1971 | Doors . |
| 3,759,282 | * | 9/1973 | Kaldenback et al. . |
| 4,447,224 | * | 5/1984 | DeCant, Jr. et al. . |
| 4,909,440 | | 3/1990 | Mitsuyasu et al. . |
| 5,165,652 | * | 11/1992 | Nicolaisen . |
| 5,560,586 | * | 10/1996 | Aruga et al. . |
| 5,597,009 | * | 1/1997 | Scherrer et al. . |
| 5,634,627 | * | 6/1997 | Daido et al. . |
| 5,718,160 | * | 2/1998 | Ohsumi . |

FOREIGN PATENT DOCUMENTS

| | | |
|---|---|---|
| 43 06 073 C1 | 6/1994 | (DE) . |
| 43 06 072 C2 | 12/1994 | (DE) . |
| 44 06 522 C1 | 7/1995 | (DE) . |
| 195 19 191 A1 | 12/1996 | (DE) . |
| 197 32 802 A1 | 4/1999 | (DE) . |
| 0 477 400 A1 | 4/1992 | (EP) . |

* cited by examiner

*Primary Examiner*—Kevin Shaver
*Assistant Examiner*—David A. Bonderer
(74) *Attorney, Agent, or Firm*—Schiff Hardin & Waite

(57) ABSTRACT

A fluid metering device that employs a sealing element for delivering a metered dose of a pressurized fluid. The sealing element includes a metal bellows sealing element or metal bellows that attaches to a valve needle and a housing. The metal bellows includes a number of corrugated elements for sealingly guiding said valve needle as the valve needle moves to deliver the metered dose of pressurized fluid.

21 Claims, 4 Drawing Sheets

FLUID METERING DEVICE

BACKGROUND OF THE INVENTION

1. Field of the Invention

The invention relates to a fluid metering device that employs a sealing element in which a pressurized fluid, such as, a liquid or a gas, can be delivered or injected in a metered dose amount by the controlled and guided movement of a valve needle.

2. Description of the Prior Art

Various sealing elements or leadthrough elements are generally known in the art. However, in the case of the application of metering fuels that are under pressure of up to 300 bar, for example, and a work temperature range of −40° C. up to +150° C., special requirements have to be met by a product that is suitable for mass production. Generally, requirements have to be met concerning brittleness, wear and reliability.

The fatigue strength or wear over time of the known O-ring seals does not meet the above requirements. Instead of O-rings, membrane seals, such as, metal beads or other like membrane seals, can also be used. However, these have the disadvantage of having a highly pressure-loaded surface that effects the movement of the valve needle. Taking a 1 $mm^2$ large pressure-loaded surface into consideration given a one-sided excess pressure of 300 bar, for example, a force of already 30 N results. Therefore, the utilization of membranes as a leadthrough or sealing element of the valve needle through a pressurized chamber cannot meet the requirements regarding a high axial elasticity or resilience and a sufficient resistance to pressure at the same time. Although a high resistance to pressure can be accounted for by a correspondingly dimensioned membrane, the increased membrane thickness results in a high axial rigidity. A pressure-independent function of the fluid metering device is not possible due to the large membrane surface and the extremely high pressure forces acting on the valve needle as a result thereof. However, a compensating member, such as, a mechanical spring, can be utilized in combination with the membrane seal to compensate or dampen the force that is directed to the valve needle via the membrane seal. Yet, the compensating member has limited use where it operates best in a single operating point.

It is also generally known that the valve needle leadthrough or sealing element can also be constructed of a clearance fit of the needle by way a cylindrical housing borehole. However, disadvantages result due to the unavoidable leakage along the needle leadthrough, so that a return line to the tank or to the low-pressure connection of the fuel feed pump is required. In addition, the overall efficiency of the motor is reduced as a result of the greater hydraulic losses.

SUMMARY OF THE INVENTION

The invention is based on the object of providing a fluid metering device that employs a sealing element which sealingly guides a valve needle through a chamber filled with a pressurized fluid while directing or exerting negligible, if any, pressure induced force which would effect the movement of the valve needle.

Many existing problems can be solved by utilizing a sealing element, such as, a metal bellows sealing element, for a valve needle that moves axially through a chamber for delivering a metered dose of a pressurized fluid that is contained within the chamber. The invention is based on the exact understanding of the behavior of the metal bellows sealing element, including its number of corrugated elements, that is subject to pressure induced forces due to a difference in pressure between the fluids that contact an external and internal surface of the metal bellows sealing element when the metal bellows sealing element is utilized to seal off a high pressurized fluid chamber from another lower pressurized fluid chamber. As a result of the metal bellows construction and operation, the amount of force that acts on the valve needle due to the metal bellows sealing element is essentially negligible, that is, it has little, if any, effect on the axial movement of the valve needle as it moves to deliver the metered dose of fluid.

A particularly advantageous embodiment provides the radial attachment of the valve needle by way of firmly connecting the metal bellows sealing element to the valve needle and the housing.

In another embodiment of the invention, the utilization of a pressure spring between the housing and the valve needle ensures a reliable closing force, which acts on the valve.

In addition to the great stability or wear of the metal bellows or metal bellows sealing element, a sealing enclosure can be employed to further protect the metal bellows. The sealing enclosure has a cylindrical construction that encloses the metal bellows so as to act as a guide for the metal bellows in order to reduced the risk of buckling.

The particular advantages of the metal bellows are achieved not only with respect to internal pressurization, that is, pressure that acts on the internal surface of the metal bellows, but also with respect to external pressurization, that is, pressure that acts on the external surface of the metal bellows.

In an embodiment, the wall thickness of the metal bellows ranges from 25 to 500 $\mu$m so as to withstand high pressures, such as, 300 bar.

Tests have indicated that it is particularly advantageous to construct the metal bellows in the form of semi-circular segments that are successively attached in a longitudinal direction. These semi-circular segments can be respectively attached by straight sections lying in between.

Advantageously, the metal bellows sealing element is firmly connected to the valve needle and the housing. For purposes of installing the valve needle and the metal bellows in the housing, for example, with respect to an injection valve with a plurality of elements interlaced in one another, the connecting points, that is, the location where the metal bellows seal element is attached to the valve needle and housing, must be optimally sized so as to minimize the amount of space for each connecting point. Weld joints, such as, laser welds, can be advantageously utilized for such purpose.

In order to be able to purposefully influence the pressure forces acting on the pressurized surfaces given high adjacent fluid pressures, a specific equilibrium, with regard to the valve needle, of the fluid pressure-conditioned forces acting in opposite directions should be present. Overall, it is desired to achieve a compensation of these forces, so that the valve needle is approximately free of forces with respect to the cited forces or so that a closing force is adjacent that increases proportionally to the pressure. This means that the pressure-effective forces are slightly larger in closing direction than the ones that are directed against the closing force. In addition, the force of a closing spring can be advantageous.

On principle, the fluid metering device can be constructed with a valve needle that can be opened to the inside or to the outside of the housing. The construction of the metal bellows sealing element must be correspondingly adapted relative to the other elements, in particular, relative to the primary drive or actuator that operates to move the valve needle. An electromagnetic mechanism or other like mechanism can be utilized as the actuator. For example, it is advantageous to utilize piezoactuators that include a biased tube spring.

DESCRIPTION OF THE PREFERRED EMBODIMENTS

Figure 1:
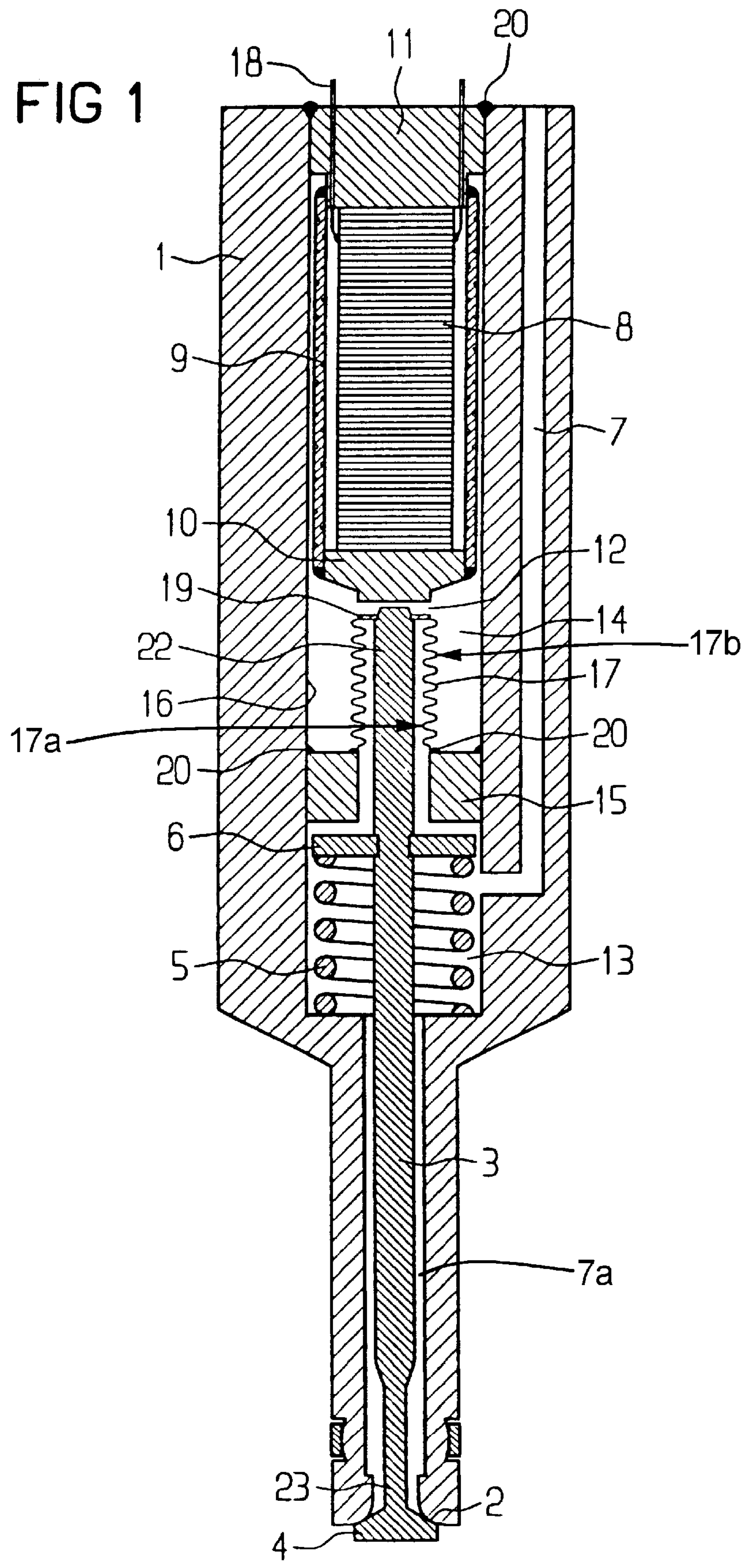
FIG. 1 shows a sectional view of a high-pressure injector with an actuator, a metal bellows sealing element that is pressurized with an internal pressure, and a valve needle that opens to the outside.

The relevant high-pressure injectors as illustrated in FIGS. 1–4 are operated with fuel pressures ("PFUEL") up to 500 bar, for example. A lift or movement of the valve needle is extremely short and is within the range of 10 to 100 $\mu$m. The housing 1 includes a chamber that has an exterior and an interior. The chamber can be further defined by a first fluid chamber 13 and a second fluid chamber 14 wherein the first 13 and second 14 fluid chambers each contain a respective first and second fluid and wherein the first fluid has a greater pressure than the second fluid. The primary drive or external pressure source, such as, an actuator 8, is located in the second fluid chamber 14. The first fluid chamber 13 communicates with a first borehole 7, such as, a line borehole, from which the first fluid is supplied under pressure. In addition, the first fluid chamber 13 communicates with a second borehole 7*a* that terminates in a mouth that is defined by a valve seat 2 of the housing which communicates with an exterior or outside of the housing.

Such a fluid metering device or hydraulic valve for purposes of metering or delivering a dosed amount of the fluid therefore separates or seals off a high-pressure space, such as, the first fluid chamber 13, from a lower pressure space, such as, the second fluid chamber 14 that has ambient pressures, for example. The leadthrough or sealing element 17, such as, the metal bellows sealing element or metal bellows of the valve needle 3 has been advantageously invented for guiding the valve needle 3 through the housing 1, that is between the exterior and interior or between the first 13 and second 14 chambers while maintaining a hydraulic seal between the different chamber regions.

Given the construction of a high-pressure injection valve for directly injecting lean-mix engines, particularly when the injection valve has a piezoelectronic actuator 8 as the primary drive, the following problems are advantageously solved:

(1) The sealing element 17 of the valve needle 3 hydraulically seals the first fluid chamber 13 from the second fluid chamber 14 in a hermetically sealed manner;

(2) the leadthrough or sealing element, such as, the metal bellows sealing element 17, has a high mechanical elasticity (low spring rate) in the direction of movement of the valve needle 3, so that the excursion of the valve needle 3 is not impaired and so that the forces that are introduced into the valve needle 3 due to the temperature-conditioned changes of length of the leadthrough element 17 or other like changes are essentially negligible;

(3) a sufficient resistance to pressure of the leadthrough element 17 is provided for typical fuel pressures of up to 500 bar;

(4) pressure-conditioned forces that directly act on the valve needle 3 or that are introduced into the valve needle 3 by way of elements, such as, the leadthrough element 17, which are mechanically connected to the valve needle 3, are optimally controlled so that these forces have a negligible effect on the axial movement of the valve needle 3 upon delivering a dosed or predetermined quantity of fluid;

(5) an extremely high reliability of the leadthrough element 17 must be guaranteed concerning leakage, i.e., that the mechanical pressures/tensile stresses that occur in the leadthrough element 17 must fall within a material-compatible range, in which the leadthrough element 17 is elastically and reversibly deformed;

(6) the leadthrough or sealing element 17 operates within the typical temperature range of −40 through +150° C.;

(7) the sealing element 17 compensates for the pressure-induced forces that act on the valve needle 3 in order to make the valve needle 3 free of these pressure induced forces altogether. For example, a high pressure opening force $F_u$ acts in the direction of the opening, which pressure force is advantageously compensated by a second pressure-loaded surface that generates a pressure force $F_0$ acting in opposite direction, due to the pressure-loaded surface of the valve head 4 of an injector opening to the outside corresponding to FIG. 1 given high fluid pressure. The valve seat diameter $d_s$ and the valve needle diameter $D_N$ are not limited and can exist in a number of different sizes to facilitate the compensation of the pressure-induced forces; and (8) the leadthrough or sealing element 17 is provided so as to provide an optimal installation and subsequent operation of the fluid metering device, such as, a fuel injector valve.

All of the above listed problems can be solved by utilizing a correspondingly constructed metal bellows sealing element 17. On the basis of the embodiment of a high-pressure fuel injector valve that opens to the outside (shown in FIG. 1), the function of the injector is initially explained and the different functions of the metal bellows sealing element or metal bellows 17 are subsequently explained.

The high-pressure fuel injector shown in FIG. 1 has a valve seat 2 in the injector housing 1. In the basic state, the valve seat 2 is closed by the valve head 4 that is connected to the second end 23 of the valve needle 3. The closed state of the fuel injector, which is formed by the valve seat 2 against the valve head 4, is provided by the biased pressure spring 5 that is connected to the valve needle 3 via a snap ring 6. The fuel supply ensues on the basis of the line borehole 7 that is attached to the housing 1. The primary drive or actuator 8 unit is situated in the upper part of the injector housing 1, which drive unit is preferably formed of a piezoelectric multilayer actuator ("PMA") 8 in low-voltage technique, combined with a tube spring 9, a top plate 10 and a bearing plate 11. The tube spring 9 is welded to the top plate 10 and to the bearing plate 11 such that the PMA 8 is under a mechanical pressure bias. The housing 1 and the bearing plate 11 are also connected optimally rigid to one another via a weld. A gap 12, whose height is significantly less than the movement of the PMA 8, is situated between the top plate 10 and the first end 22 of the valve needle 3. On one hand, the gap 12 serves the purpose of allowing for adjustments in the contact between the valve head 4 and the valve seat 2. In addition, it serves the purpose of compensating for small differences in the length of the fluid metering device elements, such as, the valve needle 3, due to thermal changes. For purposes of compensating the different thermal changes of length, i.e, to ensure that the height of the gap 12 is largely temperature-independent, the injector or fluid metering device components or elements are composed of materials with low thermal coefficients of expansion and of different materials that are matched to one another with respect to their thermal coefficients of length expansion such that the gap height remains essentially constant.

Figure 2:
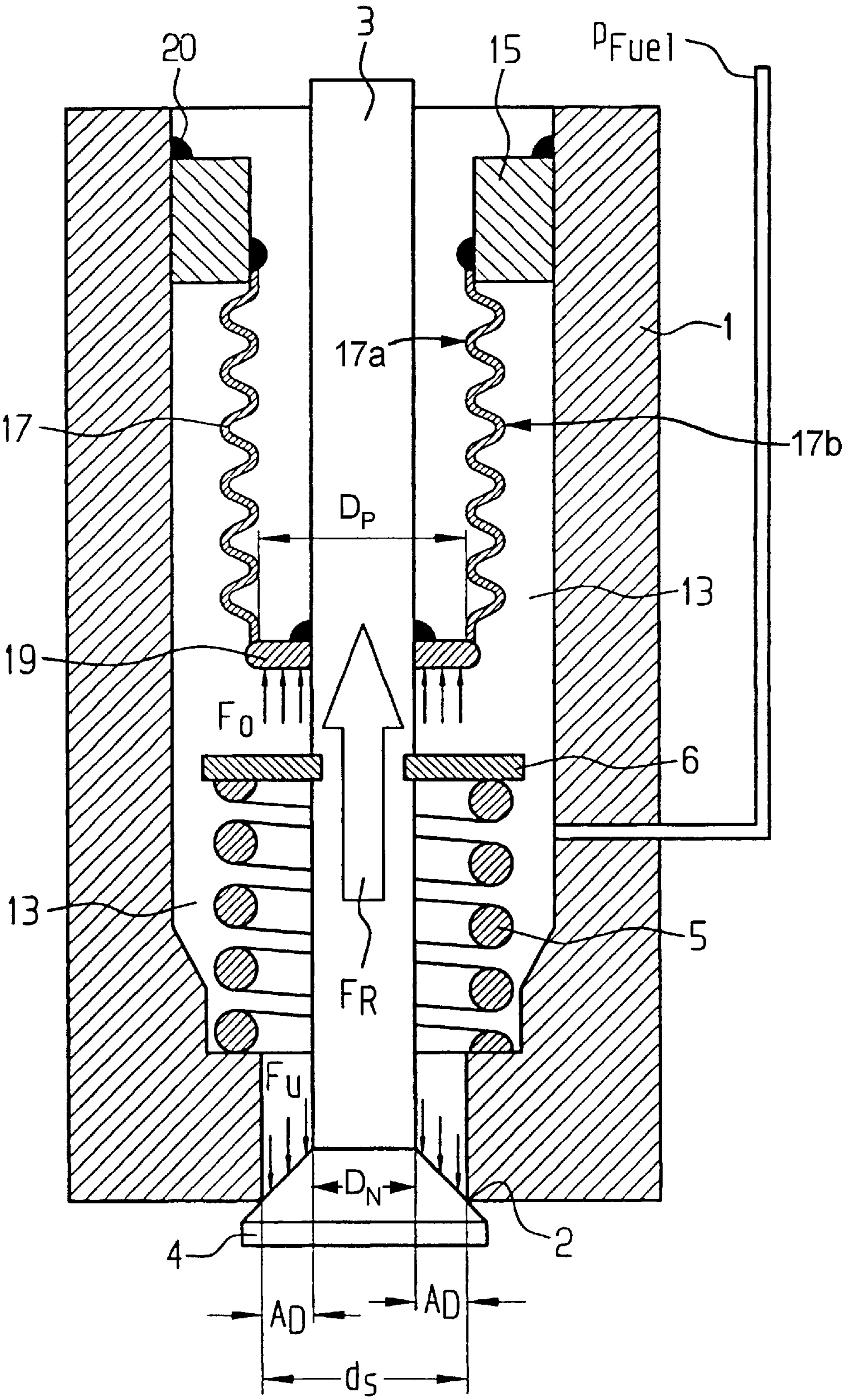
FIG. 2 shows a sectional view of a high-pressure injector with a metal bellows sealing element that is pressurized with an external pressure, and a valve needle that opens to the outside.

The perforated plate 15 that is welded to an inside borehole 16 of the housing 1 serves the purpose of leading the valve needle 3 from the fuel chamber or first fluid chamber 13 into the second fluid chamber or depressurized actuator space 14. The perforated plate 15 can also be directly attached to the housing 1. The preferable cylindrically-shaped metal bellows sealing element 17 is welded between the first end 22 of the valve needle 3 and the perforated plate 15, which the metal bellows 17 serves the purpose of hermetically or hydraulically sealing the fuel chamber 13 vis-a-vis the actuator space 14 while maintaining a high axial elasticity at the same time. In the configuration shown in FIG. 1, the metal bellows 17 is internally pressurize by the fuel or first fluid, that is, the high pressurized first fluid of the first fluid chamber 13 acts on a metal bellows internal surface 17*a* of the metal bellows 17 due to the pressure difference between the first fluid and the second fluid of the second fluid chamber 14. However, it is also possible to arrange the metal bellows 17 between the valve needle 3 (now no longer at the needle end) and the perforated plate 15 so as to be downwardly directed where it would be externally pressurized, that is, the first fluid of the first fluid chamber 13 acts on a metal bellows external surface 17*b* due to the pressure difference between the first fluid and the second fluid, as illustrated in FIG. 2.

For purposes of introducing the injection process, the primary drive or actuator 8, such as, a piezoactuator, is charged via the electrical feeders 18. As a result, the PMA 8 expands and moves the valve head 4 of the valve needle 3 from the valve seal seat 2 for delivering the first fluid, namely, fuel, from the injection valve or fluid metering device.

For purposes of completing the injection process, the PMA 8 is electrically discharged. Thereby, the PMA contracts to its original length and the valve needle 3 is moved back by way of the biased resetting spring 5 such that the valve head 4 abuts against the valve seat 2 in a hydraulically sealing manner and that the ring-shaped injection opening or mouth is closed.

Given appropriately selected geometry, the optimal utilization of the metal bellows sealing element 17 advantageously meets all of the requirements as previously discussed. As calculations and tests have indicated, the metal bellows 17 can endure extremely high pressures without being subject to irreversible deformations despite its low wall thicknesses of 50 to 500 μm, for example, due to its high radial rigidity. The metal bellows wall thickness is preferably uniform throughout the metal bellows 17. The metal bellows 17 includes a number of corrugated elements that act to give the metal bellows 17 the required high axial elasticity, namely, a low axial spring constant.

In order to, altogether, purposefully influence the pressure-effective surfaces at the valve needle 3, so that a state of complete force compensation and a state with low flow force is ideally present, the diameter of the metal bellows 17 can be correspondingly adjusted. In this way, the pressure forces acting on the valve needle 3 with valve head 4 and the pressure-induced forces that are introduced into the valve needle 3 by the end surface of the metal bellows compensate each other such that a resulting pressure force component does not act on the valve needle 3. Such a high pressure injector shows a switching behavior that is almost entirely independent of the fuel pressure, since solely the piezoelectric actuator 8 and the force of the biased resetting spring 5 are the determining factors for the opening and closing forces that are necessary for delivering the metered dose of fluid to the outside of the housing 1.

However, this is not valid to the same extent for dynamic pressures forces (pressure waves), which cannot be avoided when a high-pressure injector is opened or closed except that the pressure-balanced valve needle 3 due to the effects of the metal bellows sealing element is naturally significantly less sensitive to such effects. The metal bellows 17 has a broad work temperature range wherein the thermal changes of length of the bellows itself, due to the low axial spring constant of the metal bellows, only lead to negligibly small changes of force at the valve needle 3 (seen in axial direction). Due to its mechanical spring effect in axial direction, the metal bellows 17 can partially or completely replace the resetting spring or the pressure spring 5.

In order to understand the invention, the behavior of a pressurized metal bellows, particularly the deformations effected by the pressure and the thereby triggered forces, must be clarified. The metal bellows 17 is fixed with elements on both sides, on which forces due to the metal bellows elements are transferred in axial direction wherein the forces result from the external pressures that act on the metal bellows. In connection with the purposeful adjustment of these forces by way of the diameter of the metal bellows 17 given an optimally small axial spring constant due to the construction of the wall of the metal bellows 17, a valve needle can be designed such that a precise equilibrium of forces is present. This finding has been proved by way of simulated calculations and tests.

In particular, the change of the total length of the wall of a metal bellows by way of the number of corrugated elements due to the pressurized fluid is extremely low wherein merely the wall of the metal bellows is viewed as pressurized. During internal pressurization, the wall of the metal bellows 17 becomes slightly shorter and in comparison it becomes slightly longer during external pressurization. For example, a typical change of length of 10 to 20 μm occurs given a pressure of 200 bar and a metal bellows geometry with twelve corrugated elements, an inside diameter of 3.5 mm, an outside diameter of 5.3 mm, a wall thickness of 100 μm and a wall length of 12.1 mm. Due to the small axial spring constant of, for example, 0.2/μm of the metal bellows wall, this only leads to small changes of force at the ends of a metal bellows sealing element 17 that is fixed on both sides. The axial deformations of the corrugated elements are absolutely not slight, however, they essentially cancel out in their sum total across the total length of the metal bellows 17, in the same way that the forces which act on the individual corrugated elements. Due to this knowledge about the effects of the fluidized pressure force that acts on the metal bellows sealing element 17, the sealing element 17 can be installed and adapted to operate under both pressure orientations, i.e., internal or external pressurization as previously discussed. Despite the deformations of the corrugated elements, the mechanical tensions in the wall of the metal bellows 17 can be easily provided in a material-compatible area without significantly reducing the axial elasticity due to the range of the wall thickness from 25 to 500 $\mu$m.

A geometry that is composed of semi-circular segments that are successively arranged (seen in longitudinal section) has proven to be a particularly beneficial shape for the corrugated elements of the metal bellows sealing element 17. In contrast to a sinusoidal corrugation curve, the wall that is composed of semi-circular segments exhibits less mechanical tensions in axial direction given higher axial elasticity.

Figure 3:
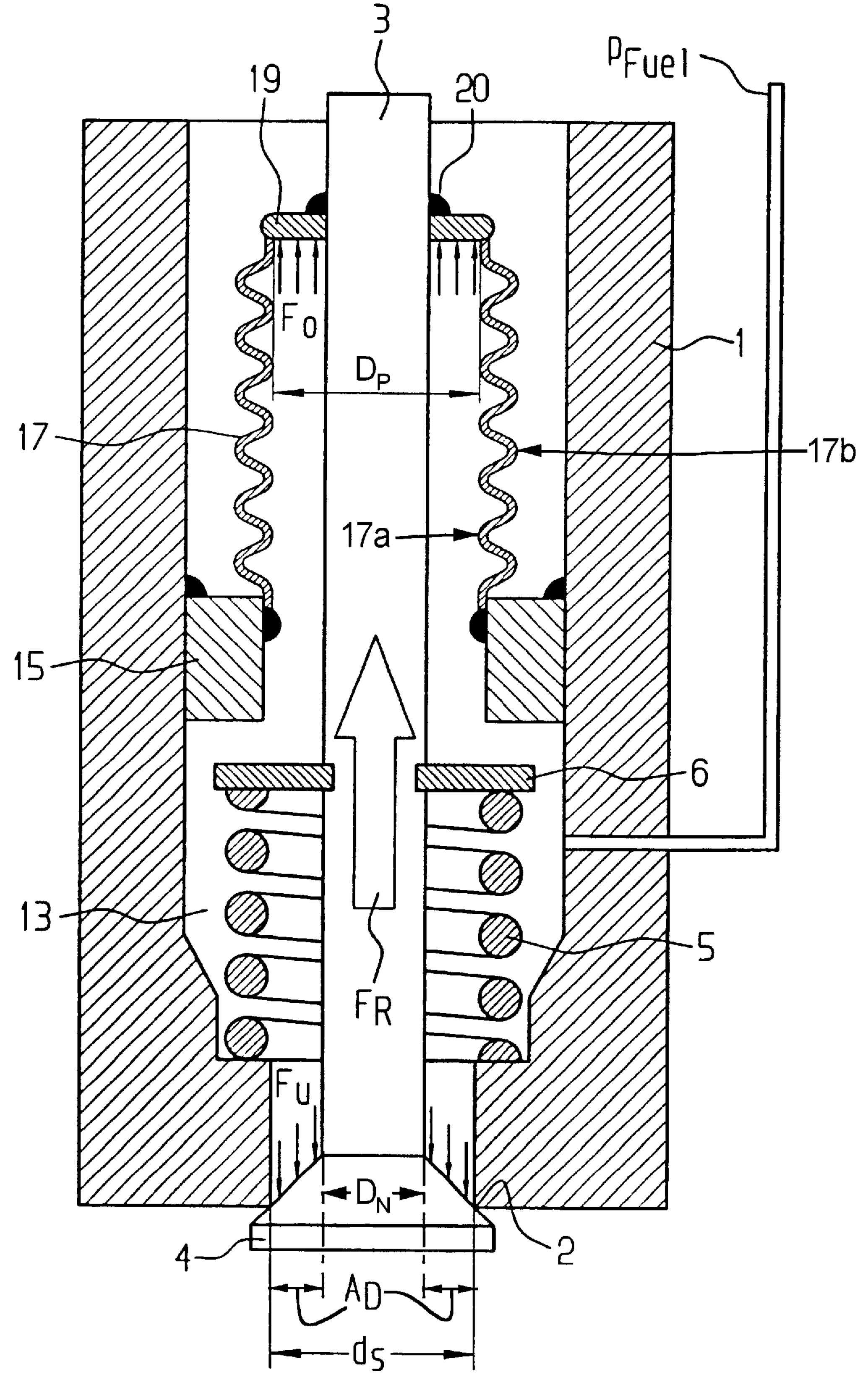
FIG. 3 shows a sectional view of a high-pressure injector with a metal bellows sealing element that is pressurized with an internal pressure, and a valve needle that opens to the outside.

Since the metal bellows sealing element wall transfers almost no resulting forces to the metal bellows sealing element ends, even when the pressures or pressure changes are high, such compensation forces, which are necessary for the pressure balance of the valve needle 3, can be purposefully adjusted by changing the diameter of the metal bellows sealing element 17. This is shown in greater detail in the FIGS. 2 and 3. FIGS. 2 and 3 respectively show an injection valve that opens to the outside. FIG. 2 shows an externally pressurized metal bellows sealing element 17, and FIG. 3 shows an internally pressurized metal bellows 17.

According to the embodiments as illustrated in FIG. 2, the high-pressure injector is dimensioned as follows. The diameter $D_N$ of the valve needle 3 is 3 mm, and the diameter $d_S$ of the valve seat 2 is 4 mm. Given a fuel pressure of 250 bar, an opening force $F_U$ with 137.5 N that is downwardly directed in the direction of the opening therefore acts on the valve needle 3 due to the resulting ring-shaped differential surface $A_D$ of 5.5 mm$^2$. Since the wall of the externally pressurized metal bellows 17 transfers almost no forces to the valve needle 3, the size of the upwardly acting compensation pressure forces and therefore the upwardly directed compensation pressure force $F_0$ can be purposefully adjusted by way of the diameter of the metal bellows 17, namely by way of the diameter $D_P$ of the front plate 19, which represents the connection between metal bellows sealing element 17 and valve needle 3. In order to fulfill the condition $F_0=F_U$ (opening force=compensation force) in the selected example, a value of $D_P$=4 mm is provided for the diameter of the front plate 19. Under these circumstances, the valve seat force is completely pressure-independent and is exclusively determined by the height of the adjusted bias force $F_R$ of the resetting spring 5. In order to avoid a contact of the corrugated elements with the valve needle 3, the diameter of the valve needle 3 can be optimally reduced with respect to the defined area of the metal bellows sealing element or metal bellows 17. An adaptation of the pressure-effective surfaces is not only restricted to a cylindrically-shaped metal bellows sealing element 17, but can also result from non-cylindrical shaped embodiments given a corresponding construction.

Regarding the installation, the metal bellows 17 can be subsequently fastened at the perforated plate 15 of the valve housing 1 and at the valve needle 3 by way of laser weld 20 subsequent to the introduction of the valve needle into the housing of the injector.

FIG. 3 shows an arrangement that is complementary to the one of FIG. 2, whereby the internally pressurized metal bellows 17 is upwardly oriented. The additional beneficial embodiment derives from the respective position of the welded seams that are preferably reinforced with mechanical compressive stresses for reasons of reliability. Given the embodiment according to FIG. 2, a specific advantage is the smaller length of the area of the valve needle 3 that is loaded due to the upwardly acting pressure forces (compensation force $F_0$) and the downwardly acting pressure forces (opening force $F_U$), wherein the valve needle 3 is thus essentially stretched less as compared to FIG. 3.

As a result of the mechanical spring effect of the metal bellows 17 in the axial direction, the metal bellows 17 can partially or also completely replace the resetting spring 5 (given the exemplary embodiments shown in the FIGS. 1, 2 and 3). Therefore, this optimal construction results in a cost savings. When an additional resetting spring (pressure spring 5) is not foregone, it can also be accommodated inside or outside of the metal bellows 17 for purposes of reducing the overall height.

Apart from the proposed cylindrical-shaped metal bellows 17, other types of construction are also imaginable, such as a conical-shaped metal bellows or metal bellows with a cross-sectional geometry that deviates from the circle shape.

Figure 4:
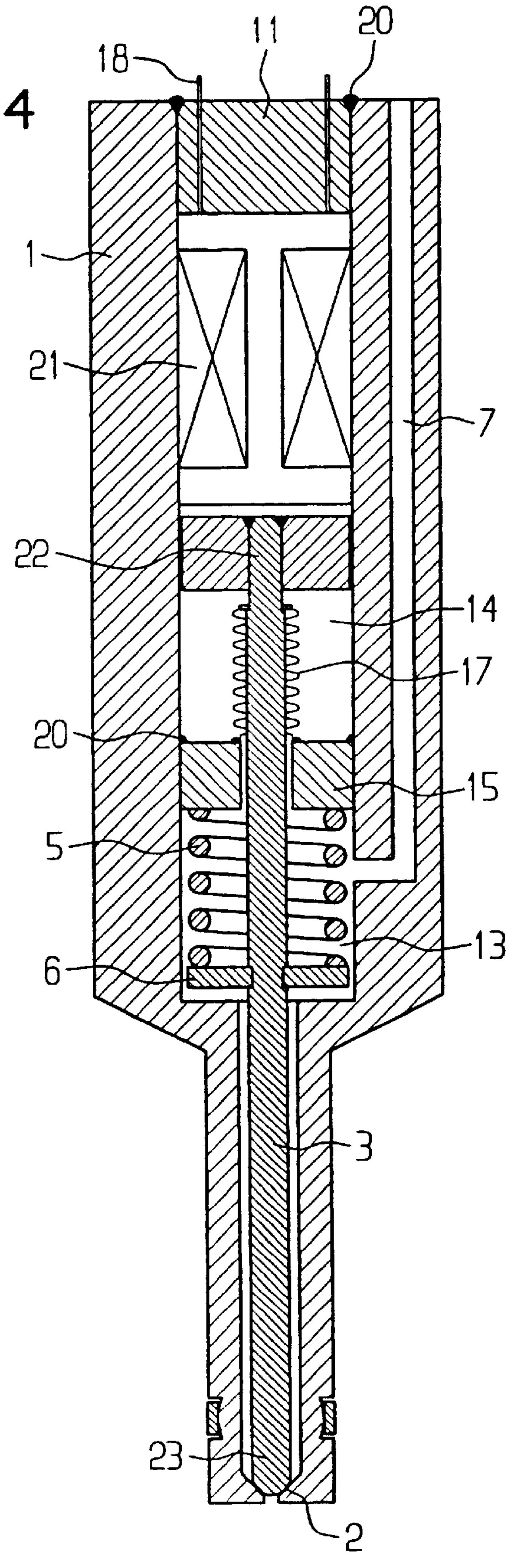
FIG. 4 shows a sectional view of a high-pressure injector with an actuator, a metal bellows sealing element that is pressurized with an internal pressure, and a valve that opens to the inside.

FIG. 4 shows an injector with a valve needle 3 that opens from the inside of the housing 1. The first fluid chamber 13 is, in turn, shown in greater detail, which chamber is under first fluid or fuel pressure and which is to be hermetically sealed against the second fluid chamber or actuator space 14. The metal bellows 17 is internally pressurized. In this case, the actuator or primary drive 8 preferably includes an electromagnetic coil 21. The electromagnet 21 is attached to the bearing plate 11 (corresponding to FIG. 1), wherein the electrical feeders 18 are guided to an outside voltage source. Laser welds 20 also preferably result from laser processing. In FIG. 4, the valve needle 3 is, in turn, a component of the valve shown in connection with the housing with respect to its second end 23 and, with its first end 22, is fashioned such that the electromagnetic coil 21 can transfer a lift movement to the valve needle 3. In this case, against the pressure force of the pressure spring 5, the electromagnetic coil 21 upwardly pulls the valve needle 3 for purposes of opening the valve by way of the valve needle 3. Subsequently supported by the pressure spring 5, the valve needle 3 falls back again to its closing position due to the deactivation of the electromagnetic coil 21. The first fluid that is delivered out of the first fluid chamber 13, due to an injection process, is supplied again under pressure via the line borehole 7.

Although modifications and changes may be suggested by those skilled in the art, it is the intention of the inventors to embody within the patent warranted hereon all changes and modifications as reasonably and properly come within the scope of their contribution to the art.

We claim as our invention:

1. A metering device for a pressurized fluid, comprising:

a housing having a chamber therein that contains a fluid, said chamber having an interior at an internal pressure and an exterior at an external pressure, said internal pressure being larger than said external pressure;

a valve needle proceeding through said chamber having a first end and a second end;

a valve seat in said housing, in fluid communication with said chamber, said second end of said valve needle being disposed to open and close said valve seat by displacement of said valve needle;

a metal bellows forming a bushing element for said first end of said valve needle from said exterior to said interior of said chamber and sealing said chamber; and said first end of said valve needle being in communication with a driving force generator to deflect said metal bellows and displace said valve needle.

2. The metering device according to claim 1 wherein said metal bellows are attached to said valve needle and said housing so as said valve needle is fixed in a radial angular position.

3. The metering device according to claim 1 further comprising a pressure spring disposed in said chamber for closing said valve seat by displacement of said valve needle.

4. The metering device according to claim 1 wherein said metal bellows are cylindrically-shaped.

5. The metering device according to claim 1 further comprising a sealing enclosure disposed for guiding said metal bellows.

6. The metering device according to claim 1 wherein said metal bellows are internally pressurized.

7. The metering device according to claim 1 wherein said metal bellows are externally pressurized.

8. The metering device according to claim 1 wherein said metal bellows has a wall thickness that ranges from 25 μm to 500 μm.

9. The metering device according to claim 1 wherein said metal bellows comprises a plurality of corrugated elements that are successively attached in a longitudinal direction along said metal bellows.

10. The metering device according to claim 9 wherein a plurality of straight members successively join each of said corrugated elements.

11. The metering device according to claim 1 wherein said metal bellows are attached by a weld seam.

12. The metering device according to claim 11 wherein said weld seam comprises a laser weld.

13. The metering device according to claim 1 further comprising a front plate disposed between said first end of said valve needle and said metal bellows.

14. The metering device according to claims 13 wherein a metal bellows diameter of said metal bellows and a front plate diameter of said front plate are dimensioned so as an amount of pressure force that acts on said valve needle due a movement of said metal bellows is effectively negligible relative to a force that causes an axial movement of said valve needle.

15. The metering device according to claim 1 wherein said pressure of said fluid in said chamber ranges from 1 bar to 500 bar.

16. The metering device according to claim 1 wherein said valve needle opens said valve seat by moving in a direction of said fluid as said fluid exits said chamber through said valve seat.

17. The metering device according to claim 1 wherein said fluid exits said chamber through said valve seat in an exit direction and wherein said valve needle opens said valve seat in a direction opposite to said exit direction of said fluid.

18. The metering device according to claim 1 wherein said driving force generator comprises an actuator.

19. The metering device according to claim 18 wherein said actuator comprises a piezoactuator that is biased by a tube spring, and wherein said piezoactuator is spaced from said first end of the valve needle by a gap distance.

20. The metering device according to claim 18 wherein said actuator comprises an electromagnetic member.

21. The metering device according to claim 1 wherein said movement of said valve needle is controlled by a plurality of defined stops.

* * * * *